US012566680B1

(12) United States Patent
Singhal et al.

(10) Patent No.: US 12,566,680 B1
(45) Date of Patent: Mar. 3, 2026

(54) DYNAMICALLY CONTROL SNAPSHOT SHARES FOR SECURED BACKUP AND RECOVERY

(71) Applicant: Dell Products L.P., Round Rock, TX (US)

(72) Inventors: Upanshu Singhal, Bangalore (IN); Ravi Vijayakumar Chitloor, Bangalore (IN); Sunil Kumar, Bangalore (IN); Gajendran Raghunathan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/023,747

(22) Filed: Jan. 16, 2025

(51) Int. Cl.
*G06F 11/14* (2006.01)
*G06F 11/1446* (2026.01)

(52) U.S. Cl.
CPC ...... *G06F 11/1469* (2013.01); *G06F 2201/84* (2013.01)

(58) Field of Classification Search
CPC .......................... G06F 11/1469; G06F 2201/84
See application file for complete search history.

(56) References Cited

U.S. PATENT DOCUMENTS

| | | | | |
|---|---|---|---|---|
| 9,665,437 | B2 * | 5/2017 | Bhargava | G06F 11/1461 |
| 11,561,978 | B2 * | 1/2023 | Upadhyay | G06N 20/00 |
| 11,675,503 | B1 * | 6/2023 | Ekins | G06F 3/0637 |
| | | | | 711/163 |
| 2018/0270290 | A1 * | 9/2018 | Sinha | H04L 67/2871 |
| 2020/0349017 | A1 * | 11/2020 | Upadhyay | G06F 3/0614 |
| 2021/0200641 | A1 * | 7/2021 | Bafna | G06F 16/1734 |
| 2021/0218636 | A1 * | 7/2021 | Parvathamvenkatas | |
| | | | | H04L 41/0883 |
| 2024/0193304 | A1 * | 6/2024 | Karr | G06F 3/0661 |

* cited by examiner

*Primary Examiner* — Merilyn P Nguyen
(74) *Attorney, Agent, or Firm* — Chamberlain, Hrdlicka, White, Williams & Aughtry; Aly Z. Dossa

(57) ABSTRACT
A method for protecting asset data includes obtaining, by a data protection system, a backup request for backing up an asset in a production environment, in response to the backup request: obtaining an asset snapshot associated with the asset, wherein the asset snapshot specifies a user list for users allowed access to the asset data associated with the asset snapshot, generating, by the data protection system, a backup user group comprising a backup user, updating a proxy data mover list with the backup user group and the user list, applying a snapshot share on the asset snapshot using the proxy data mover list, performing a backup session by a proxy data mover logged in as the backup user to store a backup of the asset data in a backup storage system, completing the backup session, and after completing the backup session, deleting the snapshot share.

17 Claims, 6 Drawing Sheets

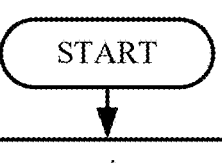

START

Obtain, by a data protection system, a request for
backing up an asset in a production environment
Step 202

Obtain an asset snapshot associated with the asset
Step 204

Obtain a user list of users with access to the obtained
snapshot
Step 206

Generate a backup user group associated with one or
more proxy data movers performing the backup and
populate the user list with the backup user group to
obtain an updated user list
Step 208

Apply a snapshot share on the obtained snapshot
using the updated user list
Step 210

Perform and complete a backup session by the proxy
data movers of the backup user group using the
snapshot share to store asset data in a backup storage
system
Step 212

Delete the snapshot share by removing the backup
user group from the user list and unmounting the
snapshot from the group of data movers
Step 214

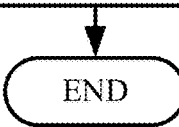

END

DYNAMICALLY CONTROL SNAPSHOT SHARES FOR SECURED BACKUP AND RECOVERY

BACKGROUND

Data protection applications may be used to protect data on external backup storage systems using block storage. The data protection applications may use snapshot technology for data consistency and offloading the load from production storage during backup. Data protection applications can perform snapshot-based restore as well to verify the data before rolling back to target storage and also for developing and testing purpose. These snapshots or their shares may be mounted on a host or in the target environment for backup purpose.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2A shows a flowchart of a method for performing a backup of an asset in a production environment in accordance with one or more embodiments of the invention.

DETAILED DESCRIPTION

Figure 1:
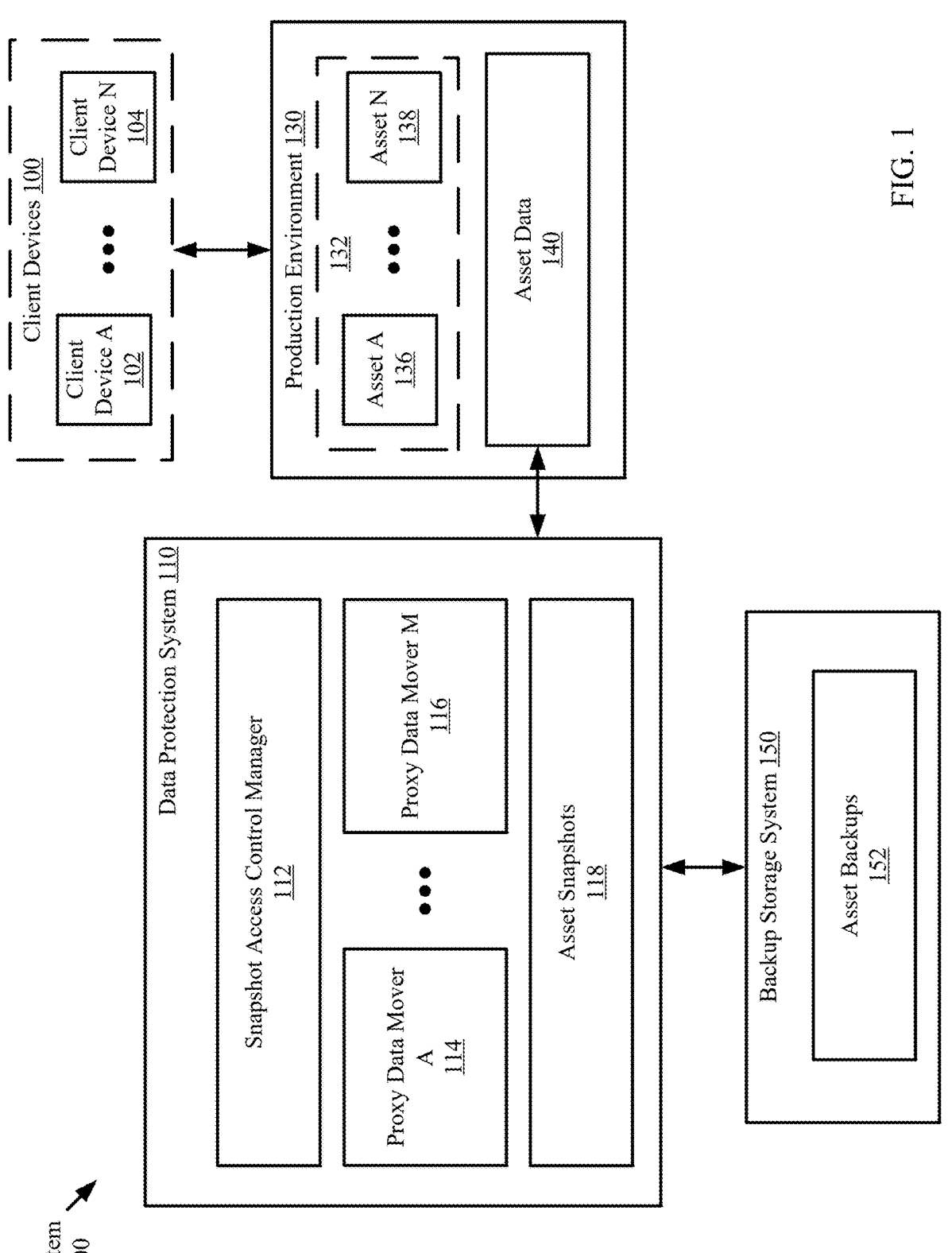
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

Embodiments of the invention include systems and methods for data protection of assets by managing the share of snapshots of one or more assets prior to performing a backup or restoration of the assets. Embodiments of the invention utilize the access control of corresponding asset data of the snapshots by including one or more backup users, each associated with a proxy data mover, in an access control group of a snapshot share (e.g., sharing read-only access of a snapshot by selected users). The snapshot share may be used by the proxy data movers to access the specified data for the purposes of backup or recovery. The access control may be dynamically managed based on the addition or removal of the proxy data movers during the data protection operations such as backups or recoveries.

Various embodiments of the invention are described below.

FIG. 1 shows a diagram of a system in accordance with one or more embodiments of the invention. The system (100) includes a data protection system (110), a production environment (130), one or more client devices (100), and a backup storage system (150). The system (100) of FIG. 1 may include additional, different, and/or different components without departing from the invention.

In one or more embodiments of the invention, the data protection system (110) includes functionality for providing data protection operations of the assets. The assets may be, for example, file systems, application data, operating systems, virtual disks, and/or other assets without departing from the invention. The data protection operations may result in asset backups (152) stored in the backup storage system (150).

In one or more embodiments of the invention, the asset backups (152) are backup images of an operating system of the production environment (130). The backup images may store OS configurations, file systems, applications, computing resource information, network information, sensitive information, and/or any other data associated with an asset without departing from the invention.

To perform the data protection operations, the data protection system (110) includes a snapshot access control manager (112), one or more proxy data movers (114, 116), and one or more asset snapshots (118). The data protection system (110) may include additional, fewer, and/or different components without departing from the invention.

In one or more embodiments, the snapshot access control manager (112) includes functionality for managing access to asset snapshots (118) by user accounts. For example, the snapshot access control manager (112) may manage an access control list (ACL), or other data structure, that indicates which user accounts are to access any of the asset snapshots (116) obtained by the data protection system (110). The access to the asset snapshots (118) is further discussed, for example, in FIGS. 2A-2C.

In one or more embodiments, a user account may be an account associated with an entity such as a user or a data protection operation (e.g., a backup or a recovery). For example, a backup user may be an example user account associated with a proxy data mover (114, 116). As another example, a user account logged into with a client device (102, 104) may be associated with a person utilizing one or more assets (136, 138) in the production environment (130) via the client device.

In one or more embodiments of the invention, a user account may be local to an environment (e.g., a client device (102, 104), the production environment (130), the data protection system (110), and the backup storage system (150)) based on the device on which the user account is logged in. For example, a user account may be local to the data protection system (110) if the user account is logged in to a proxy data mover (114, 116).

In one or more embodiments, the proxy data movers (114) include functionality for servicing data protection operations such as backups and recovery of asset data (140). The data protection operations may include accessing and transmitting asset data (140) to the backup storage system (150) from the production environment (130) to store the asset backups (152). Further, the proxy data movers (114, 116) may include functionality for recovering the data from the backup storage system (150) to the production environment (130).

To perform the aforementioned functionality, each proxy data mover (114, 116) includes functionality for accessing the asset data (140) to perform the data protection operations. The asset data (140) may be accessed by the proxy data movers (114, 116) using asset snapshots (118). In one or more embodiments, the asset snapshots (118) are data structures that each represent the asset data (140) for one of the assets (136, 138) at a point in time. The asset snapshots (118) may each include sufficient metadata such as storage locations for accessing a portion of the corresponding asset data (140) for the corresponding asset (136, 138). For example, an asset snapshot includes a file system of files in an asset (e.g., 136) and a corresponding hierarchical structure (e.g., parent and child files of each file), and whether each file is a payload file or a directory file. The access to each file in the asset snapshots (118) may be managed by the snapshot access control manager (112) as discussed throughout the present disclosure.

Figure 4:
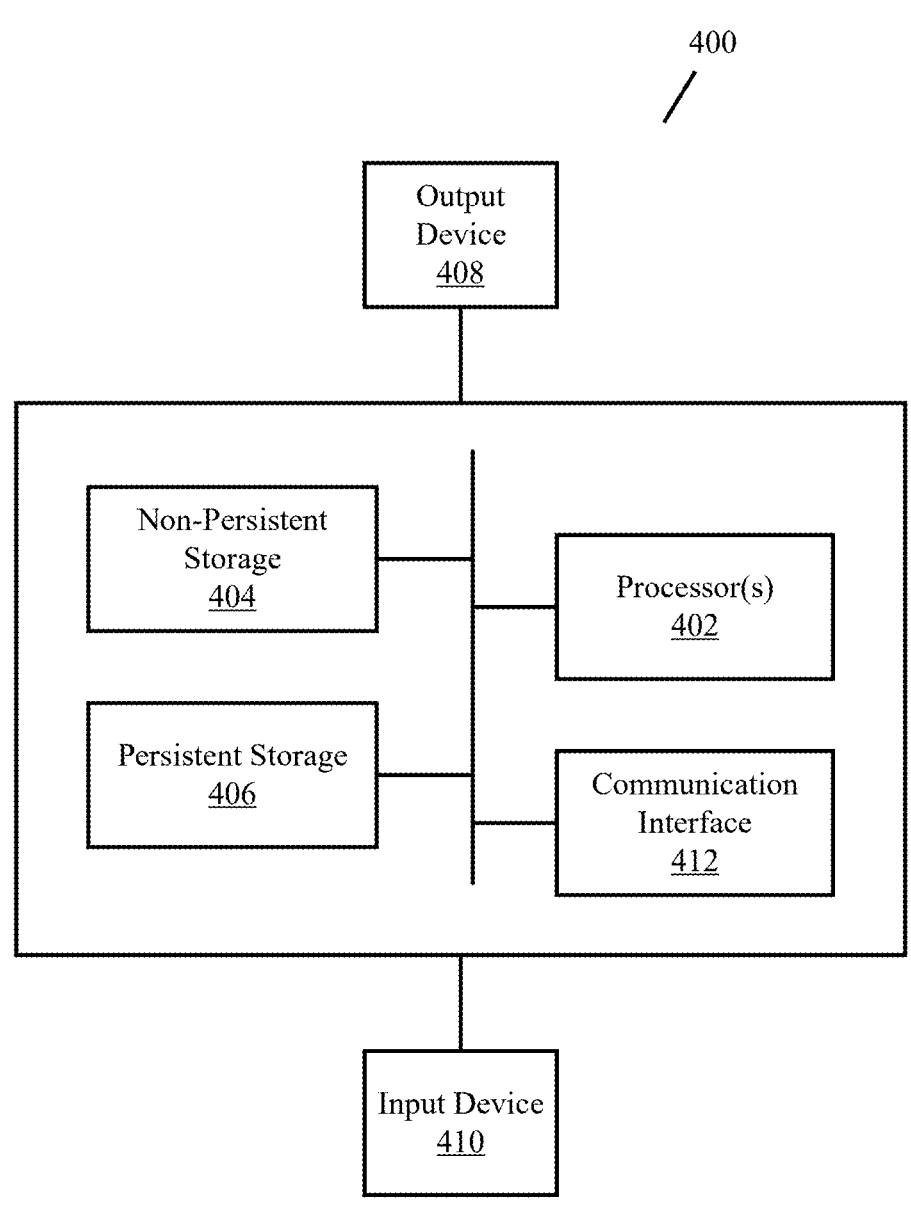
FIG. 4 shows a diagram of a computing device in accordance with one or more embodiments of the invention.

In one or more embodiments, each proxy data mover (114, 116) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the proxy data mover (114, 116) described throughout this present disclosure.

In one or more embodiments disclosed herein, the proxy data mover (100) are each implemented as a logical device. The logical device may utilize the computing resources of any number of computing devices and thereby provide the functionality of the proxy data mover (100) described throughout this present disclosure.

In one or more embodiments, while the proxy data movers (114, 116) are illustrated in FIG. 1 as a portion of the data protection system (110), one or more of the proxy data movers (114, 116) may execute independently from or otherwise externally to the data protection system (110). Said another way, one or more of the proxy data movers (114, 116) may be accessible by any other component of the system (100) of FIG. 1, including the data protection system (110), via a connection to a wide area network (WAN) such as, for example, the Internet.

In one or more embodiments disclosed herein, the data protection system (110) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection system (110) described throughout this present disclosure.

In one or more embodiments disclosed herein, the data protection system (110) is implemented as a logical device. The logical device may utilize the computing resources of any number of computing devices and thereby provide the functionality of the data protection system (110) described throughout this present disclosure.

In one or more embodiments, the production environment (130) includes functionality for providing services to users. The services may be provided using one or more hosts (not shown) that each use computing resources for providing the services and using one or more assets (132). Each asset (136, 138) may be one or more instances of applications, operating systems, virtual machines, and/or any other services without departing from the invention. The hosts may use the data protection system (110) to protect the asset data (140) generated or otherwise used by the assets (132) to provide the services to the client devices (100).

In one or more embodiments, the production environment (130) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production environment (130) described throughout this present disclosure.

In one or more embodiments disclosed herein, the production environment (130) is implemented as a logical device. The logical device may utilize the computing resources of any number of computing devices and thereby provide the functionality of the production environment (130) described throughout this present disclosure.

In one or more embodiments, the backup storage system (150) stores backups (152 of assets in accordance with data protection operations. Each device in the backup storage system (150) may be associated with a network address (e.g., an internet protocol (IP) address). The information corresponding to backups (152) stored in the backup storage system (150) and any storage location information associated with a backup may be managed by the data protection system (110). Said another way, the data protection system (110) may store the information associated with the asset backups (152) the corresponding information for accessing each backup.

In one or more embodiments disclosed herein, the backup storage system (150) is implemented as a logical device. The logical device may utilize the computing resources of any number of computing devices and thereby provide the functionality of the backup storage system (150) described throughout this present disclosure.

FIG. 2A shows a flowchart of a method for performing a backup of an asset in a production environment in accordance with one or more embodiments of the invention. The method shown in FIG. 2A may be performed by, for example, a data protection system (110, FIG. 1). Other components of the system illustrated in FIG. 1 may perform the method of FIG. 2A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 2A, in step 202, a request for backing up an asset is obtained. The request (also referred to as a backup request) may specify the asset to be backed up, the target backup storage system to which the asset is to be backed up, and/or any other information without departing from the invention.

In step 204, an asset snapshot associated with the asset is obtained. In one or more embodiments, the asset snapshot is obtained from the production environment in which the asset to be protected (e.g., backed up) operates. The asset snapshot may be generated by the production environment in response to the data protection system obtaining the backup request and initiating the generation of the asset snapshot. The asset snapshot may be subsequently transmitted to the data protection system.

In step 206, a user list of users with access to the obtained snapshot is obtained. In one or more embodiments, the user list is obtained from the production environment generating the asset snapshot. The user list may specify a list of user accounts that have been given access to the asset snapshot. In one or more embodiments, the user list may be initially generated by the production environment. Alternatively, the user list is generated by the data protection system in response to obtaining the asset snapshot.

In step 208, a backup user group associated with one or more proxy data movers performing the backup is generated. In one or more embodiments, the backup user group is generated by identifying a set of proxy data movers assigned to perform a backup session for backing up the specified asset of the backup request. After identifying the set of proxy data movers, an identifier of each proxy data mover in the set is obtained (e.g., by querying the proxy data movers). For example, if a proxy data mover is local to the production environment, an external name to the proxy data mover is obtained. After the set of proxy data movers performing the backup session is identified, the identifiers of each proxy data mover is included in a proxy data mover list. Users in the user list may be further included in the proxy data mover list.

In step 210, a snapshot share is applied to the obtained asset snapshot using the proxy data mover list. In one or more embodiments, the snapshot share includes mounting the asset snapshot to each proxy data mover specified in the proxy data mover list. The snapshot share may further include managing the access to the files specified in the asset snapshot using, for example, a snapshot access control manager of the data protection system. The access may be a "read-only" access to the data proxy movers specified in the proxy data mover list as backup users, and denying access to other users not specified in the proxy data mover list.

In step 212, a backup session is performed by the proxy data movers of the backup user group using the snapshot share to store asset data of the asset in a backup storage system. In one or more embodiments, the backup session includes accessing, in accordance with the snapshot share, the asset data in the production environment via the asset snapshot, generating a copy of the asset data, and storing the copy of the asset data as a backup of the asset in a backup storage system. After all asset data specified in the asset snapshot has been backed up, the backup session may be deemed completed.

In one or more embodiments, prior to completing the backup session, the data protection system may determine that an adjustment is to be performed for the set of proxy data movers performing the backup session. For example, it may be determined that additional proxy data movers are to be assigned to aid in the backup session. As another example, to preserve computing resources used for backup operations, fewer proxy data movers may be assigned to perform the backup session. In such scenarios in which an adjustment is to be performed for the set of proxy data movers performing the backup session, the method of FIG. 2B may be performed prior to completion of the backup session.

In step 214, following the completion of the backup session, the snapshot share is deleted. In one or more embodiments, deleting the snapshot share includes unmounting the asset snapshot from the set of proxy data movers and deleting the asset snapshot. In this manner, the asset data may not be inadvertently be accessed via the asset snapshot for any purpose other than for the backup session.

Figure 2B:
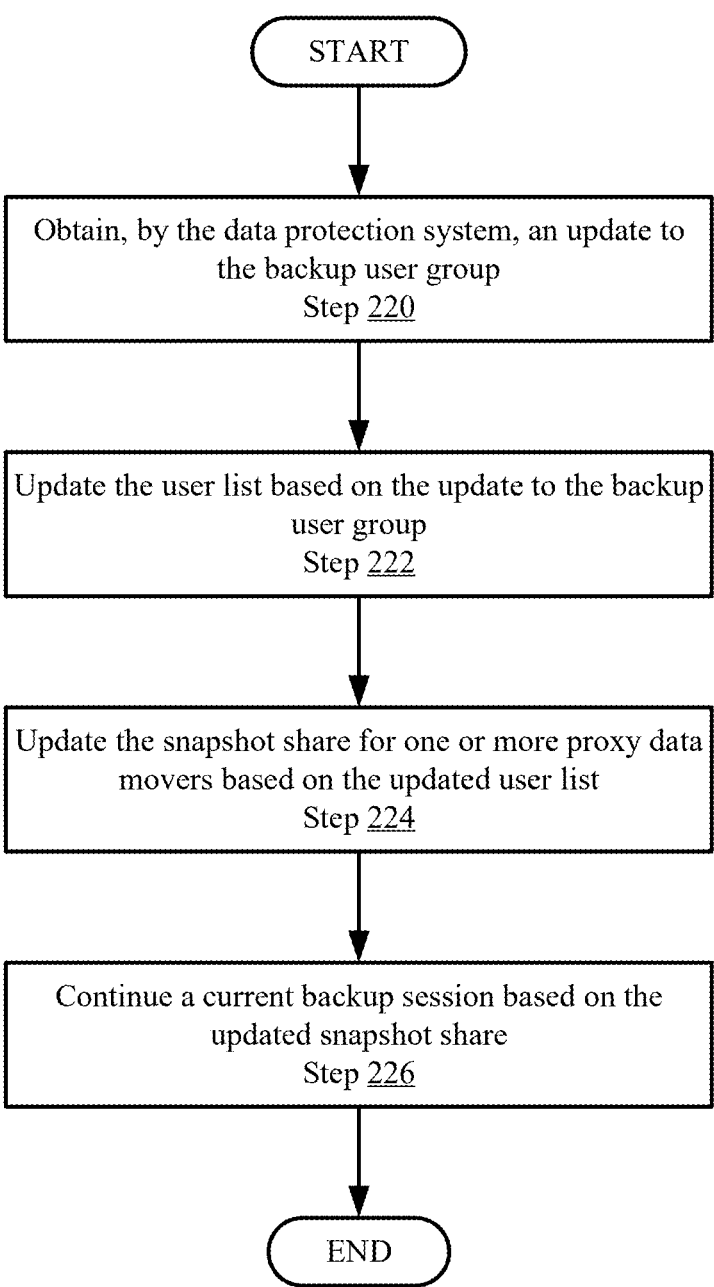
FIG. 2B shows a flowchart of a method for updating a set of proxy data movers performing a backup session in accordance with one or more embodiments of the invention.

FIG. 2B shows a flowchart of a method for updating a set of proxy data movers performing a backup session in accordance with one or more embodiments of the invention. The method shown in FIG. 2B may be performed by, for example, a data protection system (110, FIG. 1). Other components of the system illustrated in FIG. 1 may perform the method of FIG. 2B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 220, an update to the backup user group is obtained. In one or more embodiments, the update may be including additional, fewer, and/or a different set of proxy data movers currently performing the backup session. For example, a current backup session may require additional computing resources to complete the backup session within service level objectives (SLOs), and the data protection system, in turn, assigns a new proxy data mover to aid in the backup session. In such example, a backup user associated with the new proxy data mover may be included in the backup user group.

In step 222, the proxy data mover list is updated based on the update to the backup user group. In one or more embodiments, the proxy data mover list is updated to include the additional, fewer, and/or different set of proxy data movers that are to continue the backup session.

In step 224, the snapshot share is updated based on the updated proxy data mover list. In one or more embodiments, the update to the snapshot share includes mounting the asset snapshot to any new proxy data movers associated with backup users added to the proxy data mover list and unmounting the asset snapshot from any proxy data movers associated with backup users removed from the proxy data mover list.

In step 226, a current backup session is continued based on the updated snapshot share. The backup session may be continued in accordance with, for example, step 212 of FIG. 2A.

While the above method of FIG. 2B details the updating of a proxy data mover list during a backup session, a similar process may be performed in response to an update to the backup user group during a restore session without departing from the invention.

Figure 2C:
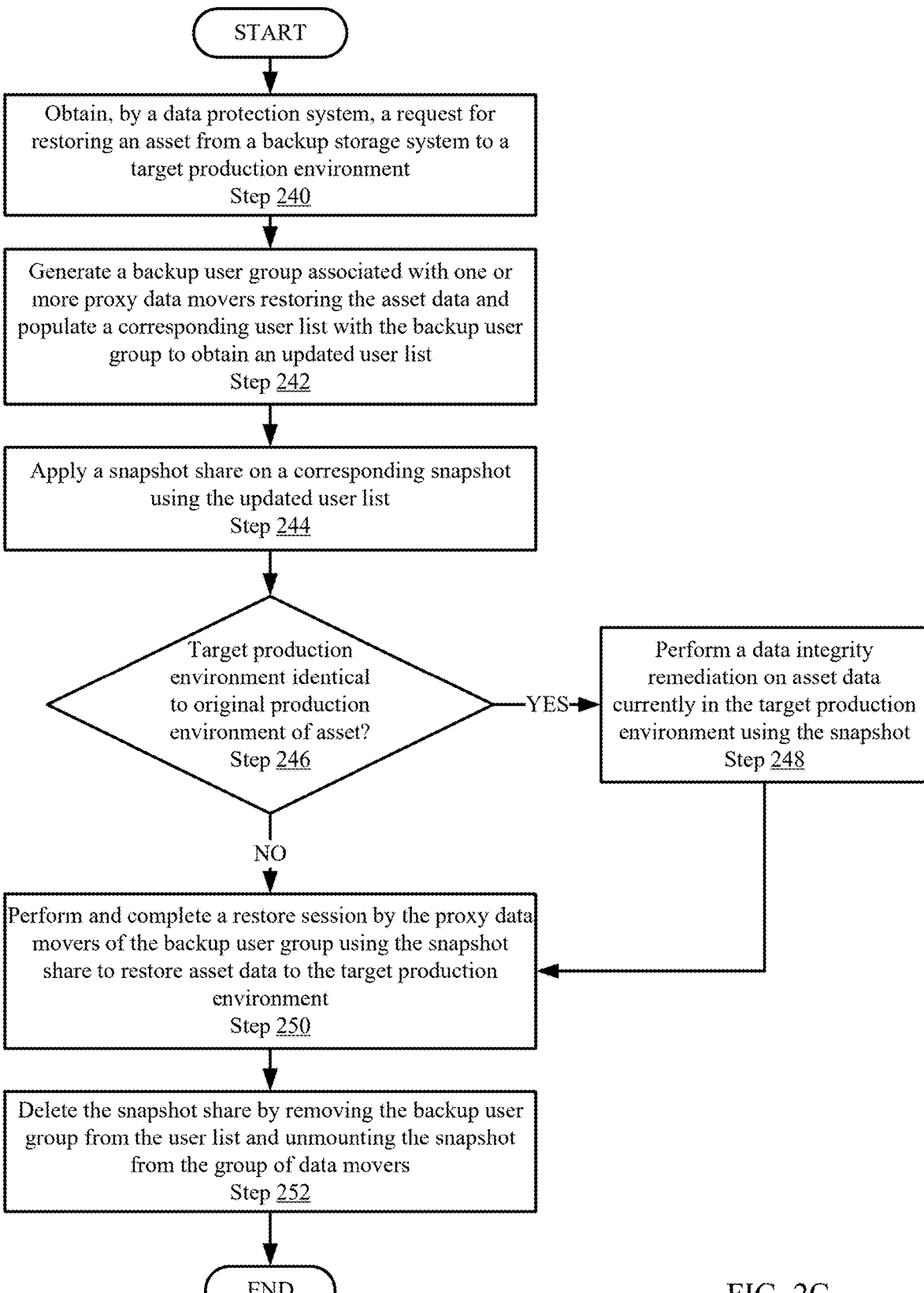
FIG. 2C shows a flowchart of a method for restoring a backup of an asset to a production environment in accordance with one or more embodiments of the invention.

FIG. 2C shows a flowchart of a method for restoring a backup of an asset to a production environment in accordance with one or more embodiments of the invention. The method shown in FIG. 2C may be performed by, for example, a data protection system (110, FIG. 1). Other components of the system illustrated in FIG. 1 may perform the method of FIG. 2C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 240 of FIG. 2C, a request for restoring an asset from a backup storage system to a target production environment is obtained. The request (also referred to as the restoration request) may specify the asset to be restored, a point in time to which the asset is to be restored, and/or the target production environment to which the asset is to be restored. The restoration request may specify any other information without departing from the invention.

In step 242, a backup user group associated with one or more proxy data movers is generated. In one or more embodiments, the backup user group is generated by identifying a set of proxy data movers assigned to perform a restoration session for restoring the specified asset of the restoration request. After identifying the set of proxy data movers, an identifier of each proxy data mover in the set is obtained (e.g., by querying the proxy data movers). A proxy data mover list associated with the restoration session is updated to include the backup user group.

In step 244, a snapshot share is applied on a corresponding asset snapshot using the updated proxy data mover list. In one or more embodiments, the asset snapshot is obtained from the backup storage system storing the asset data to be restored. Alternatively, the asset snapshot may be generated in response to the restoration request. In one or more embodiments, the snapshot share includes mounting the asset snapshot to each proxy data mover specified in the proxy data mover list and enabling access to the files specified in the asset snapshot using, for example, a snapshot access control manager of the data protection system. In contrast to a backup session, the snapshot share for the restoration session may include providing "read/write" access to the asset data by the specified users and denying access to any user not specified in the proxy data mover list.

In step 246, a determination is made about whether the target production environment is identical to the original production environment from which the asset was backed up. If the target production environment is identical, the method proceeds to step 248; otherwise, the method proceeds to step 250.

In step 248, a data integrity remediation is performed on asset data currently stored in the target production environment using the asset snapshot. In one or more embodiments, the data integrity remediation includes analyzing the asset data currently in the target production environment (i.e., the original production environment) to determine whether all asset data is available in accordance with their corresponding attributes (e.g., file data attributes). For any asset data currently in the target production environment that is not properly available in accordance with the data integrity, such asset data may be removed to prevent redundancies or inconsistent data after the restoration.

In step 250, a restore session is performed by the proxy data movers of the backup user group using the snapshot share to restore asset data to the target production environment. In one or more embodiments, the restore session includes accessing, in accordance with the snapshot share, the asset backup in the backup storage system via the asset snapshot, generating a copy of the asset data of the asset backup, and storing the copy of the asset data in the target production environment such that assets, such as virtual machines or applications, may access the asset data in the target production environment. After all asset data specified in the asset snapshot has been restored, the restore session may be deemed completed.

In step 252, the snapshot share is deleted after completion of the restore session. deleting the snapshot share includes unmounting the asset snapshot from the set of proxy data movers of the backup user group and deleting the asset snapshot.

EXAMPLE

Figure 3:
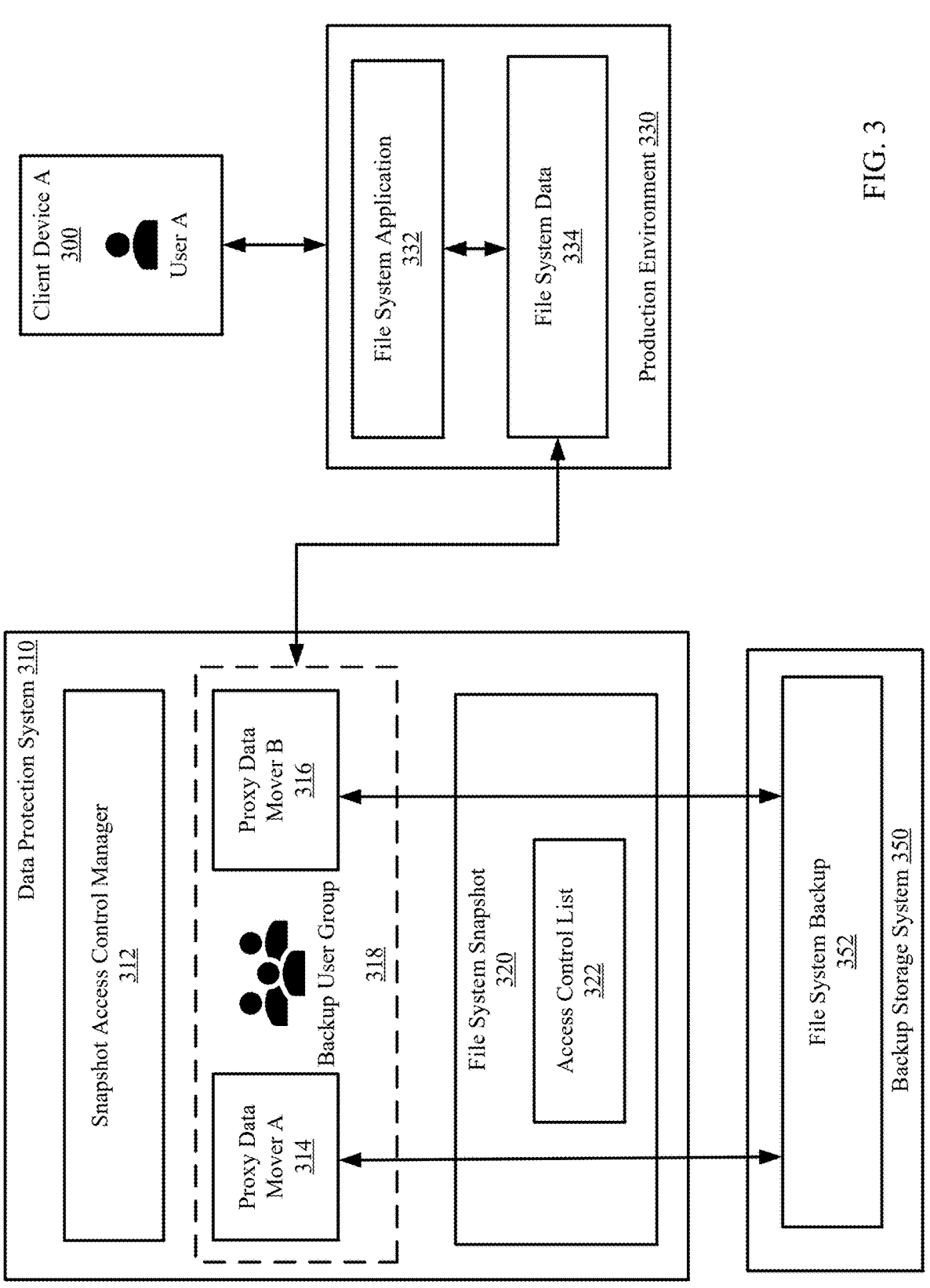
FIG. 3 shows an example system in accordance with one or more embodiments of the invention.

To clarify aspects of the invention, the following describes an example in accordance with one or more embodiments of the invention. The example, described using FIG. 3, is not intended to limit aspects of the invention. In the example, consider a scenario in which a production environment executes an asset (e.g., a file system application). Data protection services are provided to the asset data.

Turning to the example and to FIG. 3, a client device A (300) utilizes a file system application (332) executing in a production environment (330). The file system application (332) may provide a file system to the client device (300) and store data associated with the file system as file system data (334) in the production environment (330). Client device A (300) may be associated with a User A that logs into the client device (300) to access the file system via the file system application (332).

The file system application (332) utilizes the functionality of a data protection system (310) to protect the file system data (334). The data protection system (310) provides data protection services such as backing up and restoring the file system data (334) at given points in time. For example, at a first point in time, the data protection system (310) initiates a backup session for protecting the file system data (334) by storing a copy of the file system data (334) as a file system backup (352) in a backup storage system (350).

To perform the backup session, the data protection system (310) generates a file system snapshot (320) that specifies the file system at the first point in time. The file system snapshot (320) further includes an access control list (322) that specifies the users that are to access the file system snapshot (320). Following the generation of the file system snapshot (320), a snapshot access control manager (312) of the data protection system (310) generates a backup user group (318) that includes backup users that are to perform the backup session for backing up the file system data (334). A first backup user is associated with proxy data mover A (314), and a second backup user of the backup user group is associated with proxy data mover B (316). The backup user group (318) is included in the access control list (322), managed by the snapshot access control manager (312). In this manner, no other user, including user A of the client device (300) may access the file system snapshot (320). Proxy data movers A and B (314, 316) are given read-only access to the data specified in the file system snapshot (320).

Using the access granted to the backup user group (318), the backup user group (318) performs the backup session by accessing the file system data (334) via the file system snapshot (320) and storing a copy of the file system data (334) as the file system backup (352) in the backup storage system (350).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computer (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention manage the access to potentially sensitive asset data from asset snapshots intended to be used for the purposes of backups or restoration. Specifically, the generation of asset snapshots for backups or recovery may introduce a security risk to the asset data being backed up or recovered if the asset snapshot is accessible to any user. Embodiments of the invention minimize this security risk by limiting the access to the generated asset snapshots to an exclusive list of backup users associated with the entities (e.g., proxy data movers) assigned to perform the back up or restorations. In this manner, entities external to the production environment hosting the asset data may continue to perform the data protection without increasing the risk of a malicious entity modifying, or otherwise accessing, the asset data through a generated asset snapshot, thus maintaining the privacy of asset data storage.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for protecting asset data, the method comprising:

obtaining, by a data protection system, a backup request for backing up an asset in a production environment, wherein the asset comprises the asset data;

in response to the backup request:

obtaining an asset snapshot associated with the asset, wherein the asset snapshot specifies a user list for users allowed access to the asset data associated with the asset snapshot;

generating, by the data protection system, a backup user group comprising a backup user;

updating a proxy data mover list with the backup user group and the user list;

applying a snapshot share on the asset snapshot using the proxy data mover list, wherein the snapshot share comprises:

mounting the asset snapshot to the proxy data mover, and enabling access to the asset data by the proxy data mover;

performing, on the snapshot share, a backup session by a proxy data mover logged in as the backup user to store a backup of the asset data in a backup storage system; and after completing the backup session, deleting the snapshot share, wherein deleting the snapshot share comprises:

unmounting the asset snapshot from the proxy data mover; and deleting the asset snapshot.

2. The method of claim 1, further comprising:

prior to completing the backup session:

obtaining, by the data protection system, an update to the backup user group, wherein the update to the backup user group comprises including a second backup user to the backup user group;

in response to the update to the backup user group, updating the proxy data mover list to obtain a new proxy data mover list;

updating the snapshot share for providing access to a second proxy data mover of the second backup user based on the new proxy data mover list to obtain an updated snapshot share; and continuing the backup session with the updated snapshot share.

3. The method of claim 1, further comprising:

obtaining, by the data protection system, a restoration request for restoring the asset in a target production environment;

in response to the restoration request:

obtaining a second asset snapshot associated with the asset;

generating, by the data protection system, a second backup user group comprising a second backup user;

updating a second proxy data mover list with the second backup user group to obtain an updated second proxy data mover list;

applying a new snapshot share on the second asset snapshot using the updated second proxy data mover list;

performing, using the new snapshot share, a restoration session by a second proxy data mover logged in as the second backup user to restore the backup of the asset data from the backup storage system to the target production environment; and after completing the restoration session, deleting the new snapshot share.

4. The method of claim 3, wherein the target production environment is the production environment, and wherein the method further comprises: prior to performing the restoration session, performing a data integrity remediation on second asset data in the production environment using the second asset snapshot.

5. The method of claim 1, wherein the asset snapshot is generated in response to the backup request.

6. The method of claim 1, wherein the backup user is identified using a user identifier, and wherein updating the proxy data mover list comprises:

obtaining the user identifier from the proxy data mover; and populating the proxy data mover list with the user identifier.

7. A non-transitory computer readable medium comprising computer readable program code, which when executed by a computer processor enables the computer processor to perform a method for protecting asset data, the method comprising:

obtaining, by a data protection system, a backup request for backing up an asset in a production environment, wherein the asset comprises the asset data;

in response to the backup request:

obtaining an asset snapshot associated with the asset, wherein the asset snapshot specifies a user list for users allowed access to the asset data associated with the asset snapshot;

generating, by the data protection system, a backup user group comprising a backup user;

updating a proxy data mover list with the backup user group and the user list;

applying a snapshot share on the asset snapshot using the proxy data mover list, wherein the snapshot share comprises:

mounting the asset snapshot to the proxy data mover; and enabling access to the asset data by the proxy data mover;

performing, on the snapshot share, a backup session by a proxy data mover logged in as the backup user to store a backup of the asset data in a backup storage system; and after completing the backup session, deleting the snapshot share, wherein deleting the snapshot share comprises:

unmounting the asset snapshot from the proxy data mover; and deleting the asset snapshot.

8. The non-transitory computer readable medium of claim 7, the method further comprising:

prior to completing the backup session:

obtaining, by the data protection system, an update to the backup user group, wherein the update to the backup user group comprises including a second backup user to the backup user group;

in response to the update to the backup user group, updating the proxy data mover list to obtain a new proxy data mover list;

updating the snapshot share for providing access to a second proxy data mover of the second backup user based on the new proxy data mover list to obtain an updated snapshot share; and continuing the backup session with the updated snapshot share.

9. The non-transitory computer readable medium of claim 7, the method further comprising:

obtaining, by the data protection system, a restoration request for restoring the asset in a target production environment;

in response to the restoration request:

obtaining a second asset snapshot associated with the asset;

generating, by the data protection system, a second backup user group comprising a second backup user;

updating a second proxy data mover list with the second backup user group to obtain an updated second proxy data mover list;

applying a new snapshot share on the second asset snapshot using the updated second proxy data mover list;

performing, using the snapshot share, a restoration session by a second proxy data mover logged in as the second backup user to restore the backup of the asset data from the backup storage system to the target production environment; and after completing the restoration session, deleting the new snapshot share.

10. The non-transitory computer readable medium of claim 9, wherein the target production environment is the production environment, and wherein the method further comprises: prior to performing the restoration session, performing a data integrity remediation on second asset data in the production environment using the second asset snapshot.

11. The non-transitory computer readable medium of claim 7, wherein the asset snapshot is generated in response to the backup request.

12. The non-transitory computer readable medium of claim 7, wherein the backup user is identified using a user identifier, and wherein updating the proxy data mover list comprises:

obtaining the user identifier from the proxy data mover; and populating the proxy data mover list with the user identifier.

13. A system comprising:

a production environment hosting an asset;

a backup storage system;

a data protection system operating on a processor; and memory comprising instructions, which when executed by the processor, perform a method comprising:

obtaining a backup request for backing up the asset in the production environment, wherein the asset comprises asset data;

in response to the backup request:

generating an asset snapshot associated with the asset, wherein the asset snapshot specifies a user list for users allowed access to the asset data;

generating, by the data protection system, a backup user group comprising a backup user;

updating a proxy data mover list with the backup user group and the user list;

applying a snapshot share on the asset snapshot using the proxy data mover list, wherein the snapshot share comprises:

mounting the asset snapshot to the proxy data mover, and enabling access to the asset data by the proxy data mover;

performing, on the snapshot share, a backup session by a proxy data mover logged in as the backup user to store a backup of the asset data in the backup storage system; and after completing the backup session, deleting the snapshot share, wherein deleting the snapshot share comprises:

unmounting the asset snapshot from the proxy data mover; and deleting the asset snapshot.

14. The system of claim 13, the method further comprising:

prior to completing the backup session:

obtaining, by the data protection system, an update to the backup user group, wherein the update to the backup user group comprises including a second backup user to the backup user group;

in response to the update to the backup user group, updating the proxy data mover list to obtain a new proxy data mover list;

updating the snapshot share for providing access to a second proxy data mover of the second backup user based on the new proxy data mover list to obtain an updated snapshot share; and continuing the backup session with the updated snapshot share.

15. The system of claim 13, the method further comprising:

obtaining, by the data protection system, a restoration request for restoring the asset in a target production environment;

in response to the restoration request:

obtaining a second asset snapshot associated with the asset;

generating, by the data protection system, a second backup user group comprising a second backup user;

updating a second proxy data mover list with the second backup user group to obtain an updated second proxy data mover list;

applying a new snapshot share on the second asset snapshot using the updated second proxy data mover list;

performing, using the new snapshot share, a restoration session by a second proxy data mover logged in as the second backup user to restore the backup of the asset data from the backup storage system to the target production environment; and after completing the restoration session, deleting the new snapshot share.

16. The system of claim 15, wherein the target production environment is the production environment, and wherein the method further comprises: prior to performing the restoration session, performing a data integrity remediation on second asset data in the production environment using the second asset snapshot.

17. The system of claim 15, wherein the backup user is identified using a user identifier, and wherein updating the proxy data mover list comprises:

obtaining the user identifier from the proxy data mover; and populating the proxy data mover list with the user identifier.

* * * * *